United States Patent
Lu et al.

(10) Patent No.: US 8,315,072 B2
(45) Date of Patent: Nov. 20, 2012

(54) CONTROLLER FOR SWITCHING POWER SUPPLY

(75) Inventors: Huanyu Lu, Beijing (CN); En Li, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 401 days.

(21) Appl. No.: 12/720,410

(22) Filed: Mar. 9, 2010

(65) Prior Publication Data

US 2010/0302814 A1 Dec. 2, 2010

(30) Foreign Application Priority Data

May 31, 2009 (CN) .......................... 2009 1 0059455

(51) Int. Cl.
*H02M 3/335* (2006.01)
*H02H 7/122* (2006.01)
(52) U.S. Cl. .................................. 363/21.01; 363/56.05
(58) Field of Classification Search ................... 363/21, 363/21.01, 21.05, 21.13, 56.01, 56.03, 95, 363/56.05, 97
See application file for complete search history.

(56) References Cited

U.S. PATENT DOCUMENTS

| 4,791,544 | A | | 12/1988 | Gautherin et al. |
| 5,959,851 | A | | 9/1999 | Shutts |
| 5,982,645 | A | * | 11/1999 | Levran et al. .................... 363/37 |
| 7,221,128 | B2 | * | 5/2007 | Usui et al. ...................... 323/207 |
| 7,529,105 | B1 | | 5/2009 | Choi et al. |
| 7,852,647 | B2 | * | 12/2010 | Nishiyama et al. ............. 363/95 |
| 8,159,846 | B2 | * | 4/2012 | Kawabe et al. ................. 363/97 |
| 8,169,799 | B2 | * | 5/2012 | Takeuchi ................... 363/21.12 |

OTHER PUBLICATIONS

SGS Thomson (ST Microelectronics), "TDA4605—Control Circuit for Switch Mode Power Supplies Using MOS Transistors," Apr. 1, 1996, pp. 1-6.

* cited by examiner

*Primary Examiner* — Adolf Berhane
(74) *Attorney, Agent, or Firm* — Perkins Coie LLP (57) ABSTRACT

A switching power supply has an inductor that includes a coil. A chopper circuit chops the primary current drawn through the coil, for the inductor to output an induced current. A multifunction junction of the power supply has a multifunction voltage that is a function of a primary voltage that drives the coil. A first circuit suspends the chopping in response to a first sensed voltage crossing a first threshold, the first sensed voltage being a function of the multifunction voltage. A second circuit suspends the chopping in response to a second sensed voltage crossing a second threshold, the second threshold being a function of the multifunction voltage.

10 Claims, 5 Drawing Sheets

CONTROLLER FOR SWITCHING POWER SUPPLY

CROSS-REFERENCE TO RELATED APPLICATIONS

This Application claims priority to and the benefit of Chinese Patent Application No. 200910059455.X, filed May 31, 2009, which is incorporated herein by reference in its entirety.

TECHNICAL FIELD

This relates to electric switching power supplies.

BACKGROUND

A switching power supply generates electric output current to power a load. One such power supply includes a transformer and a chopper. The chopper chops the primary current conducted through the transformer's primary winding. This induces the output current to flow through the transformer's secondary winding to the load to power the load.

SUMMARY

A switching power supply has an inductor that includes a coil. A chopper circuit chops the primary current drawn through the coil, for the inductor to output an induced current. A multifunction junction of the power supply has a multifunction voltage that is a function of a primary voltage that drives the coil. A first circuit suspends the chopping in response to a first sensed voltage crossing a first threshold, the first sensed voltage being a function of the multifunction voltage. A second circuit suspends the chopping in response to a second sensed voltage crossing a second threshold, the second threshold being a function of the multifunction voltage.

The first circuit may be an overvoltage protection circuit that suspends the chopping in response to the primary voltage exceeding an overvoltage threshold that is related to the first threshold.

In another example, the first circuit may be an undervoltage protection circuit that suspends the chopping in response to the primary voltage dropping below an undervoltage threshold related to the first threshold. A shutoff circuit is configured to offset the multifunction voltage sufficiently for the multifunction voltage to cross the first threshold to cause the first circuit to suspend the chopping.

The second circuit may be a burst mode circuit that suspends the chopping when the power supply's output current, flowing through a load, exceeds a current threshold that is a function of the multifunction voltage.

DESCRIPTION

Figure 1A:
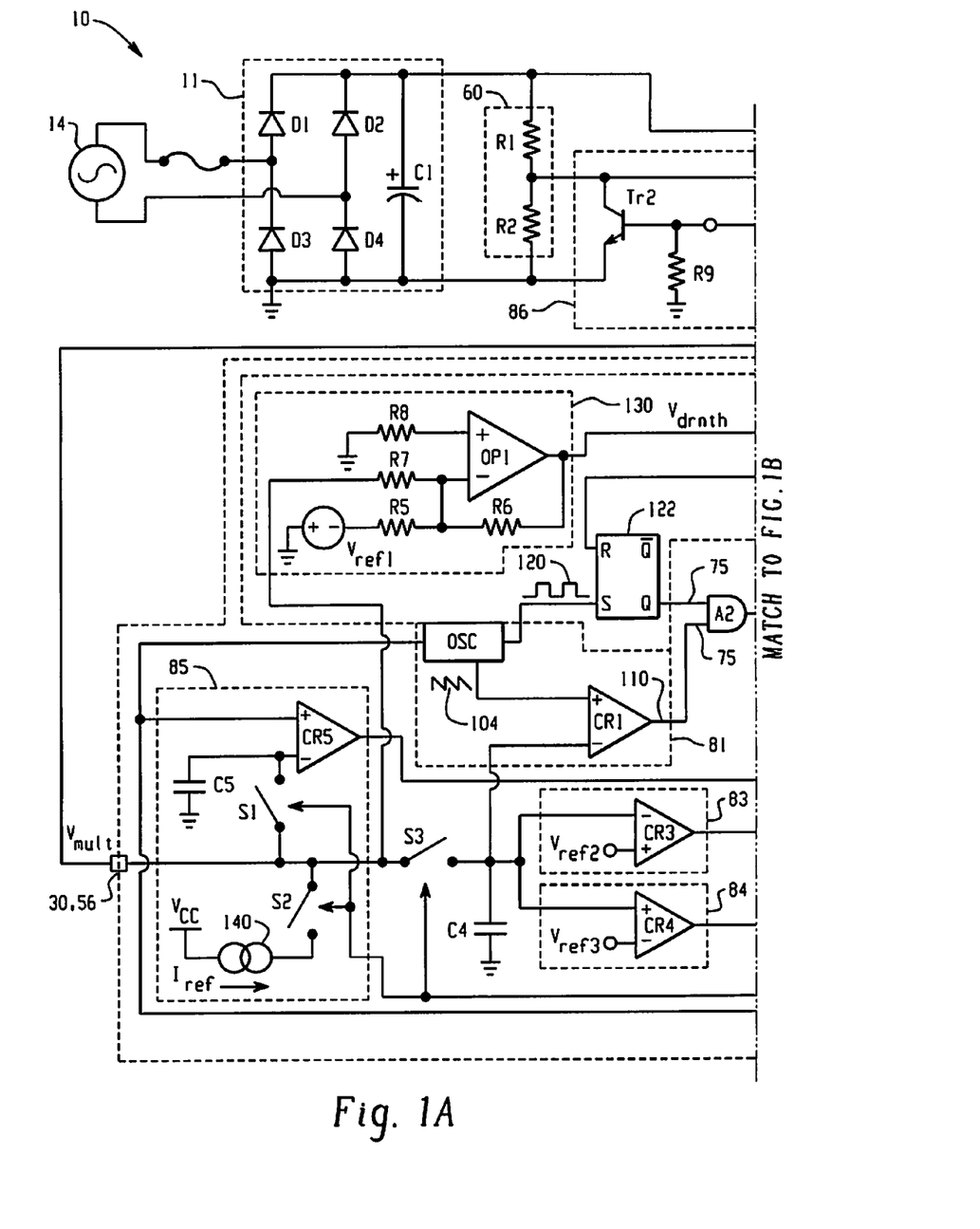
FIGS. 1A and 1B are two halves of a schematic diagram of an isolated power supply.
Figure 1B:
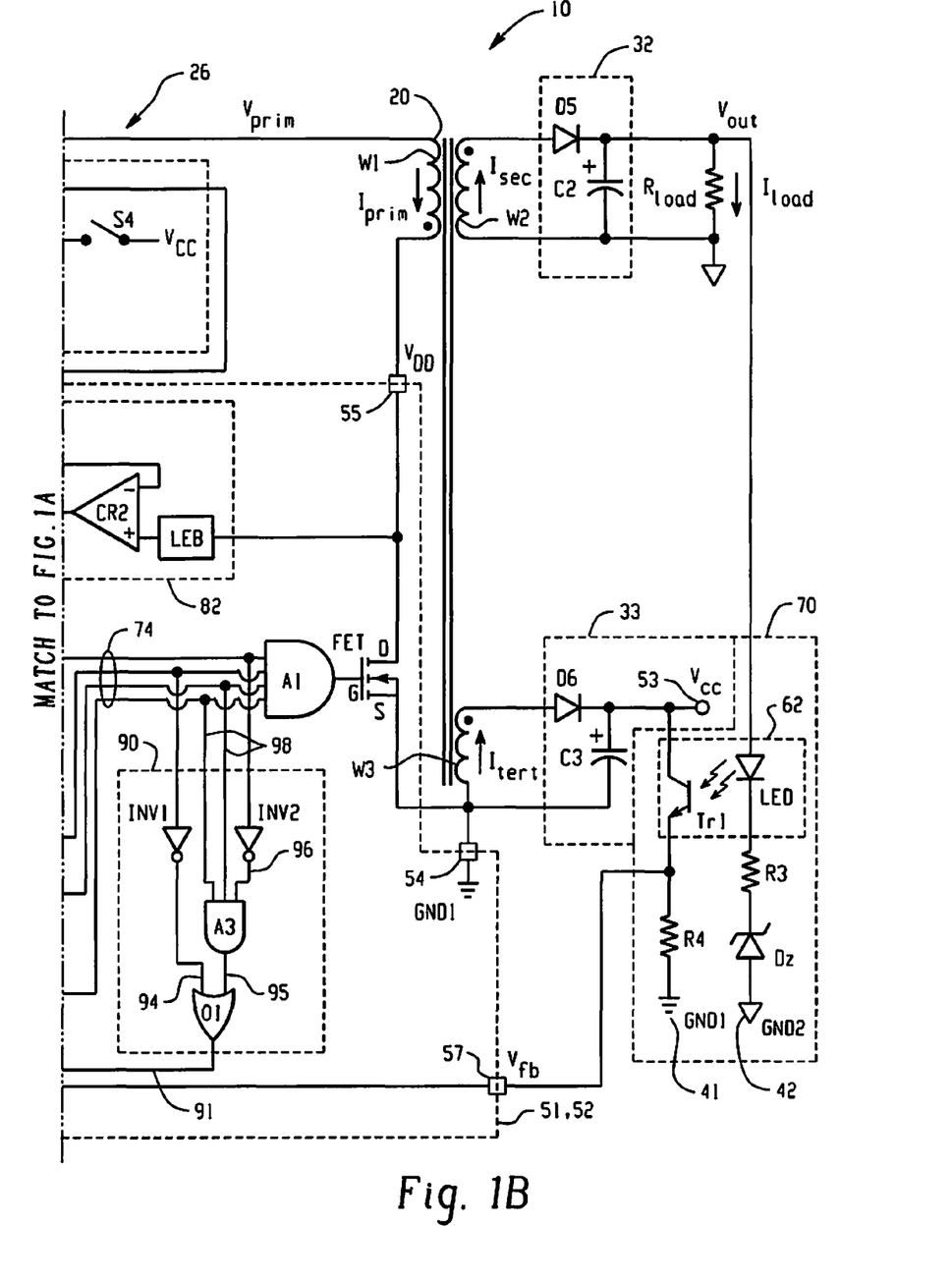

The apparatus shown in FIGS. 1A-1B has parts that are examples of the elements recited in the claims. The apparatus is a switching power supply 10. It includes a primary rectifier/filter circuit 11 that rectifies and filters an AC current, from AC source 14. It yields a DC primary current $I_{prim}$ at a primary supply voltage $V_{prim}$ to drive a primary winding W1 (or "coil") of a transformer 20. A controller 26 chops the current $I_{prim}$ conducted through primary winding W1. The resulting varying current $I_{prim}$ conducted through the primary winding W1 induces secondary and tertiary currents $I_{sec}$ and $I_{tert}$ to flow through the transformer's secondary and tertiary windings W2, W3. The induced secondary current $I_{sec}$ powers a load $R_{load}$, and the tertiary current $I_{tert}$ powers the controller 26. The controller 26 has a multifunction junction 30. The voltage $V_{mult}$ applied to this junction 30 affects operating parameters of six different functions of the controller 26. These functions are duty cycle control, primary-current limiting, overvoltage protection, undervoltage protection, burst mode and external shutoff, as explained below.

The primary rectifier/filter circuit 11 includes a full wave rectifier comprising four diodes D1, D2, D3 and D4 to full-wave rectify the AC current. This circuit 11 further includes a reservoir capacitor C1 to filter and smooth the primary voltage $V_{prim}$ that drives the primary winding W1.

A secondary rectifier/filter circuit 32 includes a diode D5 to half-wave rectify the output $V_{sec}$ of the transformer's secondary winding W2 to yield the output voltage $V_{out}$ applied to the load $R_{load}$, and a reservoir capacitor C2 to filter and smooth $V_{out}$.

Similarly, a tertiary rectifier/filter circuit 33 includes a diode D6 to half-wave rectify the output $V_{tert}$ of the transformer's tertiary winding W3 to yield the supply voltage $V_{cc}$ that powers all components of the controller 26, and a reservoir capacitor C3 to filter and smooth $V_{cc}$.

The controller 26 has a ground rail Gnd1 that is isolated from a ground rail Gnd2 of the power supply output. For that reason, the respective ground rails are denoted with different ground symbols 41, 42.

In this example, a section of the controller 26 is fabricated as an integrated circuit chip, with its components encapsulated in a single package 51. The chip package 51 has pins for interfacing with components of the supply 10 that are external to the package. These include a controller supply pin 53 tied to $V_{cc}$, a controller ground pin 54 connected to controller ground Gnd1, a drain pin 55 connected to the primary winding W1, a multifunction pin 56, and a feedback pin 57.

The multifunction pin 56 taps into a resister divider 60 extending from $V_{prim}$ to Gnd1. The resister divider 64 has an upper resister R1 and a lower resistor R2. Therefore, the voltage $V_{mult}$ at the multifunction pin equals $V_{prim}R2/(R1+R2)$. This renders $V_{mult}$ positively related to (i.e., a function of), and more specifically proportional to, $V_{prim}$ and adjustable by adjusting R1 and/or R2.

A feedback circuit 70 outputs, to the feedback pin 57, a feedback voltage $V_{fb}$ which is related to the load current $I_{load}$. The feedback section includes an optocoupler 62, which has an LED connected through a resistor $R_3$ and a Zener diode Dz to Gnd1. As long as $V_{out}$ is sufficiently higher than the Zener diode's breakdown voltage, the light intensity of the LED is positively related to $V_{out}$. Therefore, as load current $I_{load}$ decreases, $V_{out}$ increases, which increases the LED's light intensity. This increases conduction of a phototransister Tr1 of the optocoupler 62, which raises the feedback voltage $V_{fb}$ toward $V_{cc}$ against the downward bias of a bias resistor $R_4$. Accordingly, $V_{fb}$ is positively related to the output voltage $V_{out}$ applied to the load $R_{load}$, and inversely related to the load current $I_{load}$ drawn by the load.

A transistor, in this example field effect transistor (FET), has a source junction S connected to the chip's ground pin 54, a drain junction D connected to the chip's drain pin 55, and a gate junction G. Pulling the gate G high turns on the FET to sink primary current $I_{prim}$ through the primary winding W1 to controller ground Gnd1. This primary current $I_{prim}$ is driven electromotively—as opposed to inductively—in that it is generated by applying a potential difference across the coil W1. Pulling the FET gate G low turns off the FET to stop the primary coil current $I_{prim}$ from flowing through the FET. This is in contrast to the secondary and tertiary currents $I_{sec}$ and $I_{tert}$, which are inductively—as opposed to electromotively—generated.

The FET's gate G is connected to the output of a first AND gate A1 that has four inputs 74. One of these inputs is driven by a secondary AND gate A2 with two inputs 75. The FET conducts only when all inputs 74, 75 of AND gates A1 and A2 are high. Pulling any of the AND gate inputs 74, 75 low turns off the FET. The AND gate inputs 74, 75 can be pulled down by any of the six circuits—specifically a chopper circuit 81, a primary-coil current-limiting circuit 82, an overvoltage protection circuit 83, an undervoltage protection 84, a burst mode circuit 85 and a remote shutoff circuit 86, which are described below.

A switch-controller circuit 90 is configured to output a switch-controller output 91 to switches S1, S2 and S3. The switch-control signal is high if the FET is being turned off by either the chopper circuit 81 or the burst mode circuit 85 or both. This is achieved by an OR gate O1 with two OR inputs 94, 95. One OR input 94 is driven, through an inverter Inv1, by the burst mode circuit 85. The other OR input 95 is driven by a third AND gate A3 with one AND input 96 connected through an inverter Inv2 to the chopper circuit 81. The third AND gate A3 further has two other inputs 98 connected to the outputs of the overvoltage circuit 83 and the undervoltage circuit 84. Switches S1 and S2 are closed by the switch controller output 91 going high. In contrast, switch S3 is opened by the switch controller output 91 going high.

The chopper circuit 81 limits the maximum allowed duty cycle. The chopper circuit 81 includes a chopper comparator CR1 and a sawtooth generator Osc1 with a sawtooth wave output 104. The comparator CR1 has a positive input connected to the sawtooth wave output 104, and a negative input connected through switch S3 to the multifunction pin 56. When the sawtooth wave 104 drops below the multifunction voltage $V_{mult}$, the output of the comparator CR1 goes low, causing the output of the second AND gate A2 to go low, which causes the first AND gate A1 to pull the FET gate G low, which turns off the FET.

Figure 2:
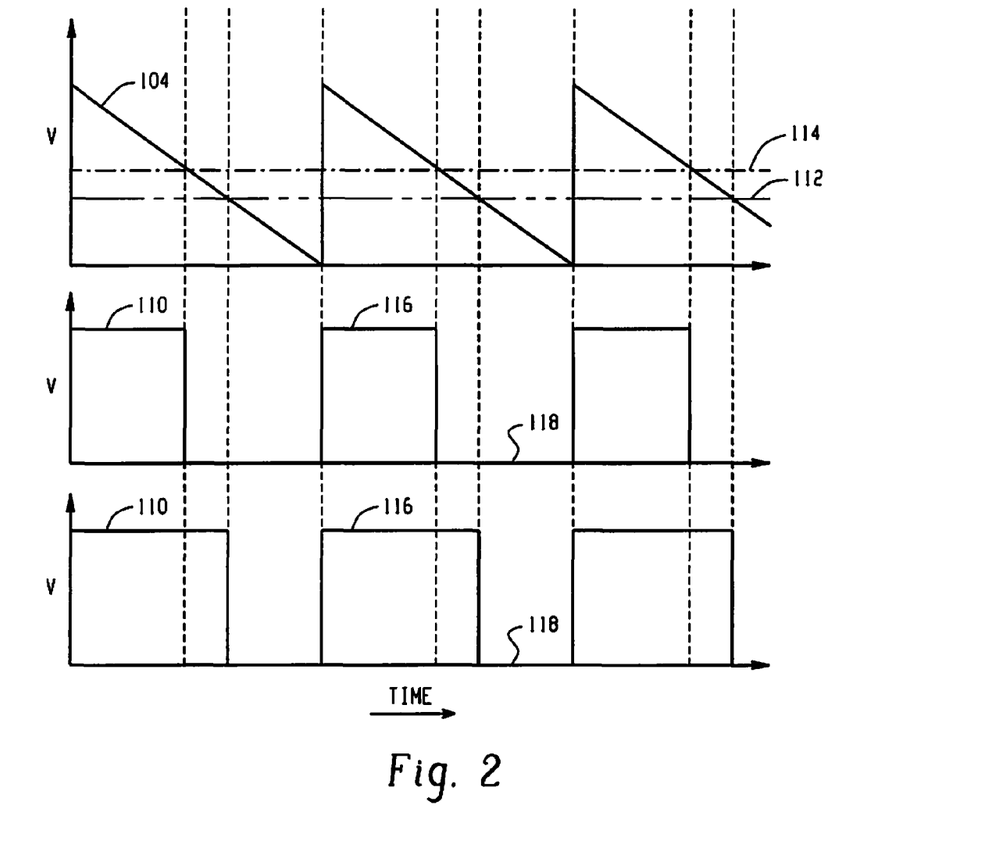
FIG. 2 shows waveforms of the power supply.

FIG. 2 illustrates the effect $V_{mult}$ has on the output signal 110 of the chopper circuit comparator CR1. It shows that raising $V_{mult}$ from a lower level 112 to a higher level 114 decreases the time the comparator output 110 is high 116 and increases the time it is low 118. This decreases the FET's on time 112 and increases the off time 114. Accordingly, the chopper's maximum allowed duty cycle is inversely related to $V_{mult}$. Since, as shown in FIGS. 1A-1B, $V_{mult}$ is itself related to $V_{prim}$, R1 and R2, the duty cycle varies with $V_{prim}$, and can be adjusted by adjusting R1 and R2. However, the chopping frequency equals the frequency of the sawtooth wave and is independent of $V_{mult}$.

The chopping of the primary coil current $I_{prim}$ by the chopper circuit 81 is effectively suspended by any one of the AND gate inputs being pulled low by any one of the primary-current limiting circuit 82, the overvoltage protection circuit 83, the undervoltage protection circuit 84, the burst mode circuit 85 and the remote shutoff circuit 86.

The primary-current limiting circuit 82 in FIGS. 1A-1B turns off the FET when the current $I_{prim}$ through the primary coil W1 exceeds a primary current threshold and keeps the FET off, even after $I_{prim}$ has dropped below the current threshold, until the next rise of the sawtooth wave. The current threshold is inversely related to the multifunction voltage $V_{mult}$.

The primary-current limiting circuit 82 utilizes a square wave 120. This wave 120 is generated by comparing the feedback voltage $V_{fb}$ to the sawtooth wave 104, similar to how the output 110 is generated by comparing $V_{mult}$ to the sawtooth wave 104. This square wave 120 is output to a Set input S of a flip-flop 122. The Reset pin R of the flip-flop 122 is connected to the output of an overcurrent comparator CR2. This comparator's positive input is connected to $V_{DD}$ through a leading edge blanking circuit LEB that blanks out induction spikes when the FET turns off.

This enables circuit 81 to control the FET. Under no fault conditions, the FET on/off is controlled by the flip-flop output Q. $V_{fb}$ is compared to the sawtooth wave 104 to generate the square wave 120. When the square wave 120 is high, meaning the flip-flop's Set input is high, the FET is turned on, and the primary current $I_{prim}$ rises. When the current reaches the threshold, circuit 82 outputs a high signal to the flip-flop's Reset input to turn off the FET.

Since the voltage across the FET increases with increasing current, the voltage applied to the positive input of the overcurrent comparator CR2 is positively related to, and more specifically approximately proportional to, the primary winding current $I_{prim}$. The negative input of comparator CR2 is connected to a drain threshold voltage $V_{drnth}$ that is output by a threshold voltage generator 130. This generator 130 includes an op amp OP1, a voltage reference $V_{ref1}$, and a network of resistors R5-R8, interconnected to render the drain threshold voltage $V_{drnth}$ equal to $(V_{ref1}/R5 - V_{mult}/R7) \times R6$, where $V_{mult} = V_{prim} R2/(R1+R2)$. As long as $V_{DD}$ exceeds $V_{drnth}$, the comparator CR2 drives the flip-flop Reset input R high, which drives the output of AND gate A2 low, which drives the output of AND gate A1 low, which turns off the FET.

This suspends the chopping of the primary coil current $I_{prim}$ as long as $V_{DD}$ exceeds $V_{drnth}$. But $V_{DD}$ is positively related to the primary coil current $I_{prim}$. And $V_{drnth}$ is inversely related to $V_{mult}$ which equals $V_{prim} R2/(R1+R2)$. Therefore, this circuit 82 effectively suspends the chopping of the primary coil current $I_{prim}$ after $I_{prim}$ exceeds a primary current threshold that inversely varies with $V_{prim}$ and can be adjusted by adjusting R1 and/or R2.

Usually, the intrinsic peak current limit is set by internal circuitry in the regulator to be constant. Once the drain current $I_{prim}$ reaches a current limit threshold, the switching cycle should terminate immediately. However, a fixed time delay $\Delta T$ is inherent from the time the threshold is reached until the FET is finally turned off. During this delay, the drain current $I_{prim}$ continues to ramp up at a rate equal to the primary voltage $V_{prim}$ divided by the inductance $L_{prim}$ of the primary coil W1. Therefore, the actual current limit is the sum of the intrinsic current limit threshold and a ramp-rate dependent component, which is the drain current ramp rate $\Delta I/\Delta t = V_{prim}/L_{prim}$. Multiplying this by the fixed time delay $\Delta T$ yields $\Delta T(\Delta I/\Delta t)$. Thus, at higher DC input voltages, the actual current limit ramps to a higher level above the intrinsic current limit level than at low DC input voltages. This can result in variations in the maximum output power $P_o = L_{prim} I_p^2/2$, where $L_{prim}$ is the primary coil's inductance and $I_p$ is the peak current limit over a range of input line voltages. $V_{mult}$ can be employed to adjust the constant maximum output power over the entire range of the input line voltages. The true peak current limit equals $(V_{ref1}/R5 - V_{mult}/R7) \times R6 + \Delta T V_{prim}/L_{prim}$, where $V_{mult} = V_{prim} R2/(R1+R2)$. The higher the input voltage $V_{prim}$, the smaller is $(V_{ref1}/R5-V_{mult}/R7) \times R6$ and the bigger is $\Delta TV_{prim}/L_{prim}$. But the true peak current limit $(V_{ref1}/R5-V_{mult}/R7) \times R6 + \Delta TV_{prim}/L_{prim}$ stays constant over the entire input line voltage.

The overvoltage protection circuit 83 turns off the FET when the primary voltage $V_{prim}$ driving the primary coil W1 exceeds an overvoltage threshold. This circuit 83 includes an overvoltage comparator CR3 that has a positive input connected to an overvoltage threshold reference $V_{ref2}$ and a negative input connected through switch S3 to the multifunction voltage $V_{mult}$.

Accordingly, when $V_{mult}$ exceeds $V_{ref2}$, the output of the overvoltage comparator CR3 goes low to turn off the FET. This effectively suspends the chopping as long as $V_{mult}$ exceeds $V_{ref2}$. Since $V_{mult}$ is related to (a function of) $V_{prim}$, this circuit 83 effectively suspends the chopping when $V_{mult}$ exceeds an effective overvoltage threshold that is related to $V_{ref2}$. More specifically, since $V_{mult}=V_{prim}R2/(R1+R2)$, the effective overvoltage threshold equals $V_{ref2}(R1+R2)/R2$. Therefore, the effective overvoltage threshold can be adjusted by adjusting R1 and/or R2. When switch S3 is opened by the OR gate O1 going high, the negative input of the comparator CR3 is isolated from $V_{mult}$, and the last voltage applied to the comparator's negative input is retained by the voltage-retaining capacitor C4.

The undervoltage protection circuit 84 turns off the FET when the primary voltage $V_{prim}$ driving the primary coil W1 is below an undervoltage threshold. This circuit 84 includes an undervoltage comparator CR4 that has a negative input connected to an undervoltage threshold $V_{ref3}$ and a positive input connected through the third switch S3 to the multifunction voltage $V_{mult}$. Accordingly, when $V_{mult}$ is below $V_{ref3}$, the undervoltage comparator's output will go low to turn off the FET. This effectively suspends the chopping as long as $V_{mult}$ is below $V_{ref3}$.

In the undervoltage protection circuit 84, since $V_{mult}$ is related to $V_{prim}$, this circuit 84 effectively suspends the chopping when $V_{mult}$ is below an effective undervoltage threshold that is related to $V_{ref3}$. More specifically, since $V_{mult}=V_{prim}R2/(R1+R2)$, the effective undervoltage threshold equals $V_{ref3}(R1+R2)/R2$. Therefore, the effective undervoltage threshold can be adjusted by adjusting R1 and/or R2.

Hysteresis can be imparted to the outputs of the overvoltage and undervoltage comparators CR3, CR4 by adding an input resistor (not shown) to each positive input and a feedback resistor (not shown), of much higher resistance than the input resistor, between the respective comparator's positive input and its output. This resistor configuration slightly raises the comparator's positive input when the comparator output is high, and slightly lowers comparator's positive input when the comparator output is low to add hysteresis.

The burst mode circuit 85 turns off the FET when Vfb, which is related to output voltage $V_{out}$, exceeds a threshold voltage. This occurs when the output current $I_{load}$ drawn by the load $R_{load}$ drops below a threshold current. This increases efficiency of the power supply 10 by increasing the length of time the FET is off and effectively suspending the chopping during time periods when the secondary reservoir capacitor C2 does not need to be replenished.

The burst mode circuit 85 includes a burst mode comparator CR5. This comparator CR5 has a negative input connected to $V_{fb}$ at the feedback pin 57. It further has a positive input connected through switches S1 and S2 to both $V_{mult}$ and a constant current source 140 (such as IC chip PSSI2021SAY by NXP Semiconductors). The current source 140 conducts a fixed current $I_{ref}$ from $V_{cc}$ to the positive input of the comparator CR5 and through resistor R2 to Gnd1. Accordingly, when both switches S1 and S2 are closed by the OR gate going high, the voltage at the comparator's positive input is $V_{prim}R2/(R1+R2)+I_{ref}R2$, where $I_{ref}R2$ equals a fixed voltage when the FET is off and approximately zero when the FET is on. When both switches S1 and S2 are opened by the OR gate O1 going low, the positive input of the comparator CR5 is isolated from $V_{mult}$ and $I_{ref}$, and the last voltage applied to the comparator's input is retained by the voltage-retaining capacitor C5.

The burst mode circuit 85 suspends the chopping when $V_{fb}$ exceeds $V_{prim}R2/(R1+R2)+I_{ref}R2$. This coincides with the output current $I_{load}$ dropping below an output current threshold. That is because $V_{fb}$ is inversely related to $I_{load}$. The burst mode entering point is positively related to both $V_{mult}$, which equals $V_{prim}R2/(R1+R2)$, and $I_{ref}R2$. Accordingly, the output voltage threshold and the output current threshold can be adjusted by adjusting R1 and/or R2.

The remote shutoff circuit 86 includes a transistor Tr2 connecting the multifunction pin 56 to Gnd1. It enables shutting off the chopping with a switch S4 that can be external to the chip housing 52, to the controller 26 and to the power supply 10. The switch S4 in this example is a manually-controlled mechanical switch, but can alternatively be an electronically-controlled switch. When the switch S4 is closed, it connects the gate of the transistor Tr2 to Vcc, which causes the transistor Tr2 to sink $V_{mult}$ to Gnd1, which offsets $V_{mult}$ to a level below the undervoltage threshold $V_{ref3}$. This causes the undervoltage circuit 84 to turn off the FET. This effectively suspends the chopping as long as the external switch S4 is activated. When the switch S4 is released, a biasing resister R9 pulls the gate of transistor Tr low to turn off the transistor Tr and restart the chopping.

The overvoltage, undervoltage and external shutoff circuits 83, 84 and 86 share a common feature, of suspending the chopping based on comparing $V_{mult}$ to a reference. This is contrary to the chopper, primary-current limiting and burst mode circuits 81, 82 and 85, in which $V_{mult}$ is the reference to which other sensed voltages are compared.

The example power supply of FIGS. 1A-1B is an "isolated" type power supply, in which the inductor is a transformer with a primary coil W1 electrically isolated from the secondary coils W2, W3. The controller 26 chops the current flowing through the primary coil W1 to generate output current through the secondary coils W2, W3 by means of mutual induction between the primary winding W1 and secondary coils W2, W3.

Figure 3A:
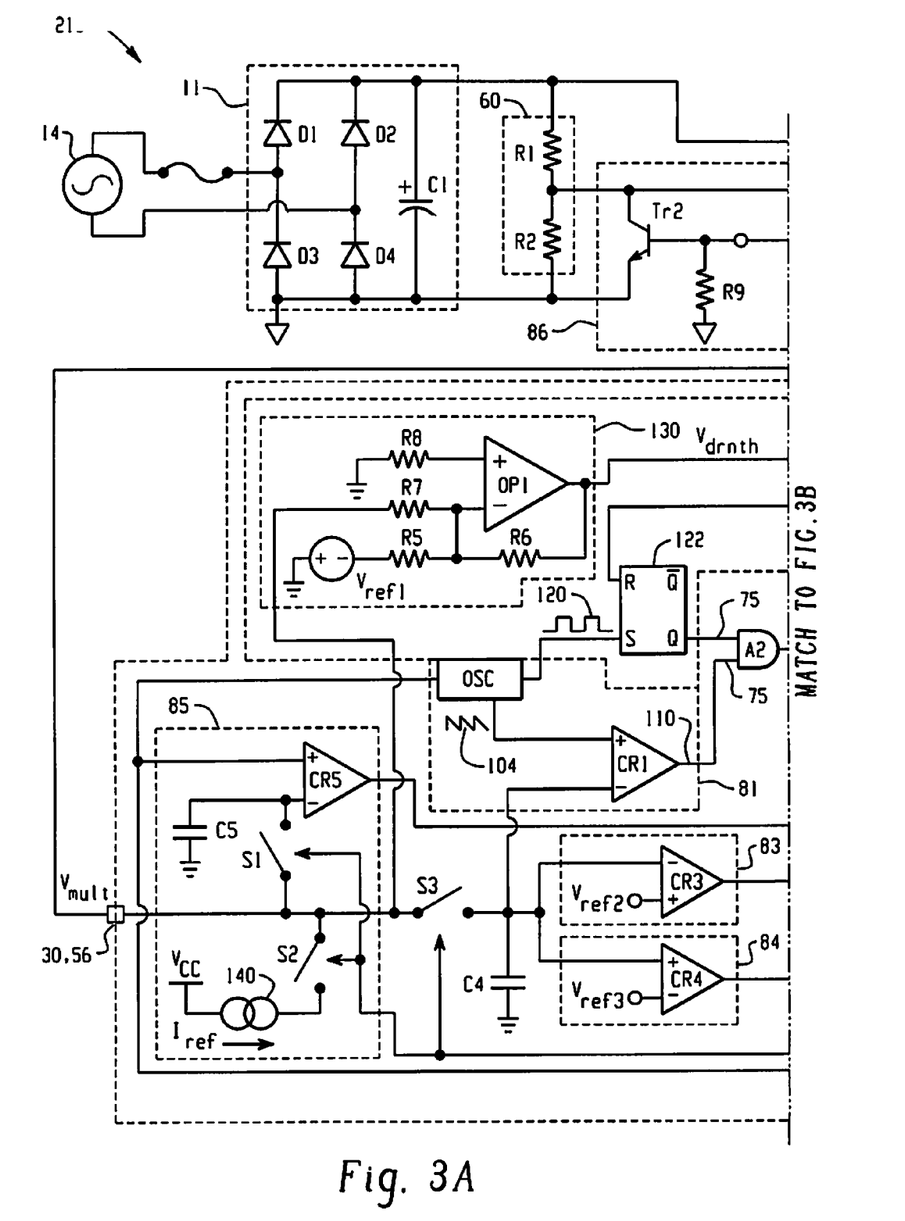
FIGS. 3A and 3B are two halves of a schematic diagram of a non-isolated power supply
Figure 3B:
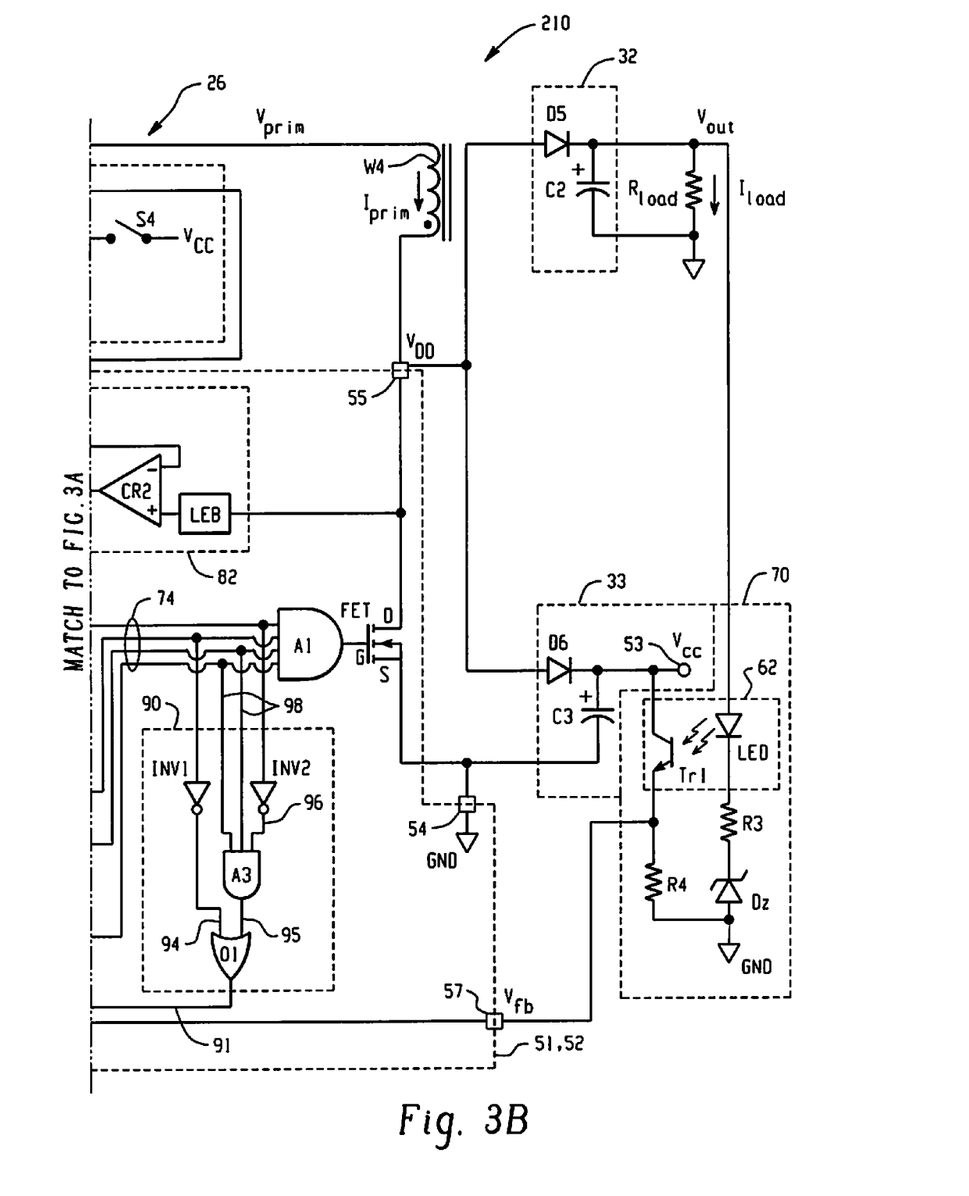

Another type of power supply 210 is shown in FIGS. 3A-3B, in which components are labeled with the same reference numerals as corresponding components in FIGS. 1A-1B. It is a "non-isolated", more particularly "boost", type power supply in which the inductor includes only a single coil W4. In this type of power supply, the controller chops primary current through the coil W4 to inductively generate an induced current through the same coil W4 by self-induction. The functions of the controller 26 for this non-isolated power supply 10' are the same as for the "isolated" supply of FIGS. 1A-1B.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

The invention claimed is:

1. A switching power supply comprising:
   an inductor including a coil;
   a chopper circuit configured to chop a primary current drawn through the coil, for the inductor to output an induced current;
   a multifunction junction having a multifunction voltage that is a function of a primary voltage that drives the coil;
   a first circuit configured to suspend the chopping in response to a first sensed voltage crossing a first threshold, the first sensed voltage being a function of the multifunction voltage; and
   a second circuit configured to suspend the chopping in response to a second sensed voltage crossing a second threshold, the second threshold being a function of the multifunction voltage, wherein the second circuit is a burst mode circuit that suspends the chopping when the power supply's output current, flowing through a load, exceeds a current threshold that is a function of the multifunction voltage.

2. A switching power supply comprising:
   an inductor including a coil;
   a chopper circuit configured to chop a primary current drawn through the coil, for the inductor to output an induced current;
   a multifunction junction having a multifunction voltage that is a function of a primary voltage that drives the coil;
   a first circuit configured to suspend the chopping in response to a first sensed voltage crossing a first threshold, the first sensed voltage being a function of the multifunction voltage; and
   a second circuit configured to suspend the chopping in response to a second sensed voltage crossing a second threshold, the second threshold being a function of the multifunction voltage, wherein the second circuit is a burst mode circuit that suspends the chopping when the power supply's output voltage, driving a load, exceeds a voltage threshold that is a function of the second threshold which is itself a function of the multifunction voltage.

3. A switching power supply comprising:
   an inductor including a coil;
   a chopper circuit configured to chop a primary current drawn through the coil, for the inductor to output an induced current;
   a multifunction junction having a multifunction voltage that is a function of a primary voltage that drives the coil;
   a first circuit configured to suspend the chopping in response to a first sensed voltage crossing a first threshold, the first sensed voltage being a function of the multifunction voltage; and
   a second circuit configured to suspend the chopping in response to a second sensed voltage crossing a second threshold, the second threshold being a function of the multifunction voltage, wherein the second circuit is a primary-current limiting circuit, and the second sensed voltage is a function of the primary current drawn through the coil, whereby the second circuit suspends the chopping in response to the primary current exceeding a primary current threshold that is related to the multifunction voltage.

4. The power supply of claim 3 wherein the second circuit, when suspending the chopping, continues to suspend the chopping, even after the primary current has dropped below the primary current threshold, until the onset of a following clock cycle.

5. The power supply of claim 3 wherein the second sensed voltage is derived from a primary voltage at a junction between the chopper circuit and the coil.

6. The power supply of claim 3 wherein the primary current threshold is inversely related to the multifunction voltage which is itself positively related to a primary voltage at a junction between the chopper circuit and the coil.

7. A switching power supply comprising:
   an inductor including a coil;
   a chopper circuit configured to chop a primary current drawn through the coil, for the inductor to output an induced current;
   a multifunction junction having a multifunction voltage that is a function of a primary voltage that drives the coil;
   a first circuit configured to suspend the chopping in response to a first sensed voltage crossing a first threshold, the first sensed voltage being a function of the multifunction voltage; and
   a second circuit configured to suspend the chopping in response to a second sensed voltage crossing a second threshold, the second threshold being a function of the multifunction voltage,
   wherein the chopper circuit is configured to chop the primary current with a duty cycle that is a function of the multifunction voltage and wherein the chopper circuit, when chopping the primary current by repetitively conducting and blocking the primary current, determines when to conduct and when to block based on comparing a waveform output to a waveform threshold that is a function of the multifunction voltage.

8. A switching power supply comprising:
   an inductor including a coil;
   a chopper circuit configured to chop a primary current drawn through the coil, for the inductor to output an induced current;
   a multifunction junction having a multifunction voltage that is a function of a primary voltage that drives the coil;
   a first circuit configured to suspend the chopping in response to a first sensed voltage crossing a first threshold, the first sensed voltage being a function of the multifunction voltage;
   a second circuit configured to suspend the chopping in response to a second sensed voltage crossing a second threshold, the second threshold being a function of the multifunction voltage; and
   switches and a switch control circuit that are together configured in a first situation to connect the multifunction junction to the first circuit while isolating the multifunction junction from the second circuit, and in a second situation to connect the multifunction junction to the second circuit while isolating the multifunction junction from the first circuit.

9. The power supply of claim 8 wherein the first circuit is an overvoltage protection circuit, the second circuit is a burst mode circuit, and the second situation is based on the primary current being interrupted by the burst mode circuit.

10. A controller for a switching power supply, the power supply having an output junction configured to output an output current to a load, and further having an inductor including a coil for inductively generating the output current from a varying primary current drawn through the coil, the controller comprising:
    a chopper circuit configured to chop the primary current;
    a multifunction junction having a multifunction voltage that is a function of a primary voltage that drives the coil, for the chopper circuit to chop the primary current with a duty cycle that is a function of the multifunction voltage;

an overvoltage protection circuit configured to suspend the chopping in response to the multifunction voltage exceeding an overvoltage threshold;

an undervoltage protection circuit configured to suspend the chopping in response to the multifunction voltage dropping below an undervoltage threshold;

a shutoff circuit configured to drop the multifunction voltage below the undervoltage threshold to cause the undervoltage protection circuit to suspend the chopping;

a burst mode circuit configured to suspend the chopping when the output current exceeds a current threshold that is a function of the multifunction voltage; and a primary-current limiting circuit that suspends the chopping in response to the primary current exceeding a primary current threshold that is related to the multifunction voltage, and that continues to suspend the chopping, even after the primary current has dropped below the primary current threshold, until the onset of a following clock cycle.

* * * * *